(12) United States Patent
Klimov et al.

(10) Patent No.: US 11,829,844 B2
(45) Date of Patent: Nov. 28, 2023

(54) REFINING QUBIT CALIBRATION MODELS USING SUPERVISED LEARNING

(71) Applicant: Google LLC, Mountain View, CA (US)

(72) Inventors: Paul Klimov, Santa Barbara, CA (US); Julian Shaw Kelly, Santa Barbara, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 18/088,303

(22) Filed: Dec. 23, 2022

(65) Prior Publication Data

US 2023/0306292 A1    Sep. 28, 2023

Related U.S. Application Data

(63) Continuation of application No. 16/772,387, filed as application No. PCT/US2017/066766 on Dec. 15, 2017, now Pat. No. 11,556,813.

(51) Int. Cl.
*G06N 10/00* (2022.01)
*G06N 20/00* (2019.01)
*G06N 5/04* (2023.01)

(52) U.S. Cl.
CPC .......... *G06N 10/00* (2019.01); *G06N 5/04* (2013.01); *G06N 20/00* (2019.01)

(58) Field of Classification Search
CPC .......... G06N 10/00; G06N 5/04; G06N 20/00
See application file for complete search history.

(56) References Cited

U.S. PATENT DOCUMENTS

| | | | | |
|---|---|---|---|---|
| 10,282,675 | B2 * | 5/2019 | Bloom | G06N 10/00 |
| 10,839,306 | B2 * | 11/2020 | Mezzacapo | G06N 10/00 |

(Continued)

FOREIGN PATENT DOCUMENTS

| | | |
|---|---|---|
| CN | 102037475 | 4/2011 |
| CN | 106537424 | 3/2017 |

(Continued)

OTHER PUBLICATIONS

International Preliminary Report or Patentability and Written Opinion in International Appln. No. PCT/US2017/006766, dated Jun. 16, 2020, 12 pages.

(Continued)

*Primary Examiner* — Naum Levin
(74) *Attorney, Agent, or Firm* — Fish & Richardson P.C.

(57) ABSTRACT

A computer-implemented method for refining a qubit calibration model is described. The method comprises receiving, at a learning module, training data, wherein the training data comprises a plurality of calibration data sets, wherein each calibration data set is derived from a system comprising one or more qubits, and a plurality of parameter sets, each parameter set comprising extracted parameters obtained using a corresponding calibration data set, wherein extracting the parameters includes fitting a qubit calibration model to the corresponding calibration data set using a fitter algorithm. The method further comprises executing, at the learning module, a supervised machine learning algorithm which processes the training data to learn a perturbation to the qubit calibration model that captures one or more features in the plurality of calibration data sets that are not captured by the qubit calibration model, thereby to provide a refined qubit calibration model.

20 Claims, 7 Drawing Sheets

(56) References Cited

U.S. PATENT DOCUMENTS

| | | | |
|---|---|---|---|
| 10,846,366 B1 * | 11/2020 | Otterbach | G06N 7/01 |
| 11,074,495 B2 * | 7/2021 | Zadeh | G06F 18/2413 |
| 11,195,057 B2 * | 12/2021 | Zadeh | G06N 3/006 |
| 11,521,103 B1 * | 12/2022 | Reagor | G06N 10/80 |
| 11,556,813 B2 * | 1/2023 | Klimov | G06N 10/00 |
| 2014/0229722 A1 | 8/2014 | Harris | |
| 2015/0026112 A1 | 1/2015 | Alboszta et al. | |
| 2015/0317558 A1 | 11/2015 | Adachi et al. | |
| 2016/0125311 A1 | 5/2016 | Fuechsle et al. | |
| 2017/0017894 A1 | 1/2017 | Lanting et al. | |
| 2017/0351967 A1 | 12/2017 | Babbush et al. | |
| 2017/0357561 A1 | 12/2017 | Kelly | |
| 2020/0394524 A1 * | 12/2020 | Vainsencher | G06N 10/40 |
| 2021/0035005 A1 | 2/2021 | Martinis et al. | |
| 2022/0366288 A1 * | 11/2022 | Reagor | H03K 19/195 |

FOREIGN PATENT DOCUMENTS

| | | | |
|---|---|---|---|
| CN | 106909972 | | 6/2017 |
| KR | 102417057 | | 7/2022 |
| KR | 102417057 B1 * | | 7/2022 |
| WO | WO 2017078734 | | 5/2017 |
| WO | WO 2019005206 | | 1/2019 |
| WO | WO-2019005206 A1 * | 1/2019 | G06F 18/214 |
| WO | WO-2019057317 A1 * | 3/2019 | G06N 10/00 |

OTHER PUBLICATIONS

International Search Report and Written Opinion in International Appln. No. PCT/US2017/066766, dated Aug. 28, 2018, 18 pages.

Mavadia et al., "Prediction and real-time compensation of qubit decoherence via machine-learning" Submitted on Apr. 2016, arXiv:1604.03991, 6 pages.

Neil et al., "A blueprint for demonstrating quantum supremacy with superconducting qubits" Submitted on Sep. 2017, arXiv:1709.06678, Sep. 2017, 22 pages.

Office Action in Australian Appln. No. 2017443044, dated Jan. 28, 2021, 5 pages.

Office Action in Australian Appln. No. 2021204723, dated Jun. 7, 2022, 4 pages.

Office Action in Canadian Appln. No. 3,085,866, dated Jul. 14, 2021, 5 pages.

Office Action in Chinese Appln. No. 201780097753.0, dated Mar. 29, 2023, 13 pages (with English translation).

* cited by examiner

REFINING QUBIT CALIBRATION MODELS USING SUPERVISED LEARNING

This application is a continuation application of, and claims priority to, U.S. patent application Ser. No. 16/772,387, filed Jun. 12, 2020, now issued U.S. Pat. No. 11,556,813, which application is a National Stage Application under 35 U.S.C. § 371 and claims the benefit of International Application No. PCT/US2017/066766, filed Dec. 15, 2017. The disclosures of the foregoing applications are hereby incorporated by reference in their entirety.

This specification relates to quantum computing. In particular, it relates to refining qubit calibration models using supervised learning.

Computation on a quantum computer can be realized by manipulating physical quantum bits (qubits). However in order to operate a physical qubit in a useful capacity, many parameters relating to the qubit may need to be calibrated. Various techniques have been developed to calibrate such parameters.

In one example aspect, the present specification describes an automated qubit calibration method. The method comprises performing calibrations on one or more qubits to obtain calibration data sets and corresponding extracted parameter sets. Performing each calibration comprises obtaining a calibration data set from a system comprising one or more qubits, and determining one or more extracted parameters. Determining one or more extracted parameters comprises fitting one or more parameters of a qubit calibration model to the calibration data set, using a fitter algorithm. The one or more extracted parameters may be stored, and the qubit calibration model may be refined using at least some of the calibration data sets and corresponding stored parameters.

In one example aspect, refining a qubit calibration model comprises receiving, at a learning module, training data, wherein the training data comprises: a plurality of calibration data sets, each calibration data set being derived from a system comprising one or more qubits, and a plurality of parameter sets, each parameter set comprising extracted parameters obtained using a corresponding calibration data set, wherein extracting the parameters includes fitting a model to the corresponding calibration data set using a fitter algorithm. Refining the qubit calibration model may further comprise executing, at the learning module, a supervised learning algorithm which processes the training data to learn a refined qubit calibration model that captures one or more features in the plurality of calibration data sets that are not captured by the qubit calibration model. The refined qubit calibration model may allow qubit parameters to be extracted more reliably. This results in a technical improvement in the field of quantum computing.

So that the invention may be more easily understood, embodiments thereof will now be described, by way of example only, with reference to the accompanying figures, in which.

Figure 6:
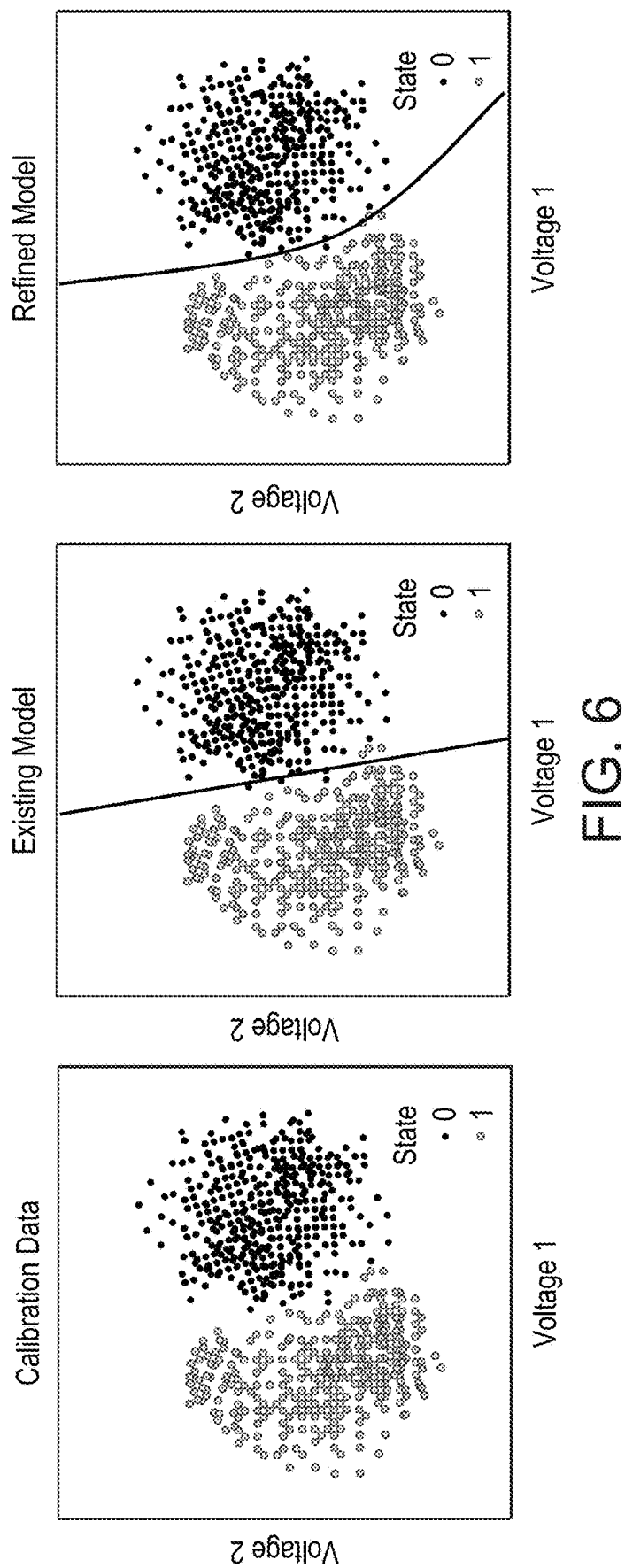

an existing model, and a refined model;

FIG. 6 is an illustration depicting: calibration data for a classification-based calibration; an existing model, and a refined model;

FIG. 7(a) is an illustration depicting calibration data;

FIG. 7(b) is an illustration depicting an existing calibration model function;

FIG. 7(c) is an illustration depicting a perturbation formed by three basis expansion functions;

FIG. 7(d) is an illustration depicting a refined model;

FIG. 7(e) is an illustration depicting a fit of the refined model to a calibration data set.

OVERVIEW

Examples aspects of the present disclosure relate to refining qubit calibration models using supervised learning.

Figure 1:
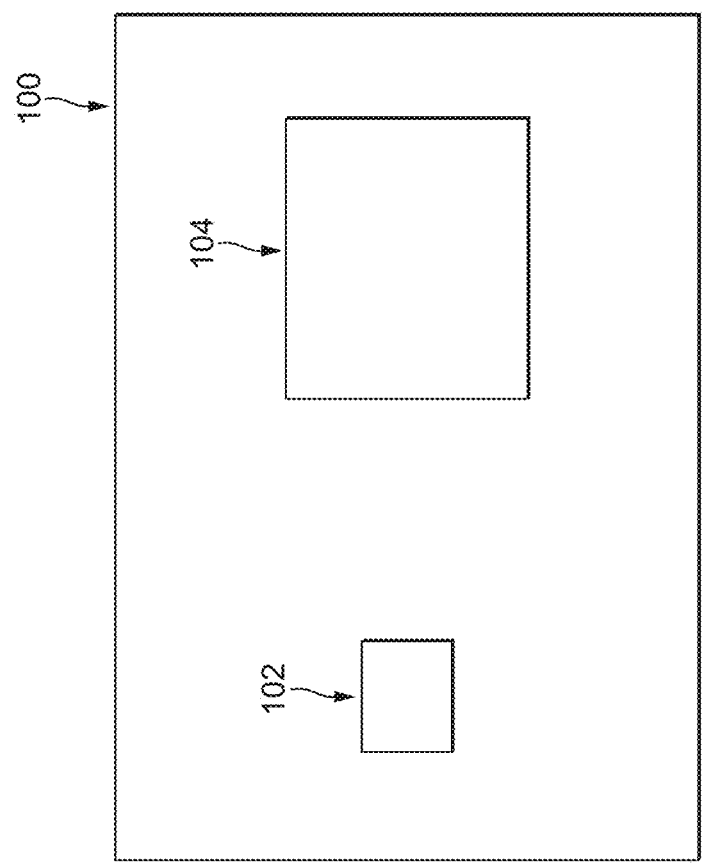
FIG. 1 is a schematic illustration of a system comprising a physical qubit.

FIG. 1 is a schematic depicting a system 100 comprising a physical qubit 102, and control and measurement apparatus 104 for interacting with the qubit 102. The qubit may be one of a plurality of qubits which form the qubit system of a quantum computer. Suitable control and measurement apparatus for interacting with the qubit 102 by varying hardware parameters and measuring the response of the system 100 are known per se to those skilled in the art of quantum computing and will not be described in any detail here. In various examples the qubit may be a superconducting qubit, or may comprise a system based on one or more ion traps, quantum dots, neutral atoms, Rydberg states, solid-state defects, molecules, or photons.

In order to operate a physical qubit in a useful capacity, many parameters relating to the qubit (e.g. in some cases more than fifty parameters per qubit), may need to be calibrated, some or all of which may depend on other parameters and their calibrations. Examples of parameters which may be calibrated include qubit frequency, qubit anharmonicity, pi pulse length, pi/2 pulse length, pi pulse amplitude, pi/2 pulse amplitude, readout pulse frequency, readout pulse length, and readout pulse power.

Calibrating a qubit may comprise varying hardware parameters of the system 100, measuring the response of the system 100, and using the measured results to obtain values for one or more qubit parameters. It will be understood that as used herein, the term "qubit parameter" refers to any parameter associated with a qubit, including qubit control parameters relating to e.g. qubit control and/or measurement hardware.

The hardware parameters that are varied when taking calibration data may be given by an array x, where each element of x can for example be a time, a voltage, a phase or frequency of a microwave pulse, the length of a pulse, or other suitable parameter. The system response $S(x)$ may be a real number representing voltage, or a phase of a microwave pulse, etc, and so may for example be defined by x=(voltage amplitude 1, voltage amplitude 2, . . . , phase). Alternatively, or in addition, the system response may comprise a discriminatory label such as 0, 1, etc representing a qubit state.

In an exemplary method according to one aspect of the present disclosure, calibration procedures are performed to determine one or more values for one or more parameters relating to the qubit. Such calibration procedures may be referred to herein as "calibrations". An example of a calibration is a Rabi driving calibration, which may be used to extract a parameter such as the driving length of a pi-pulse. Another example of a calibration is a qubit frequency calibration which may be used to determine the frequency at which to drive a qubit. Other examples include calibration procedures to determine values for operating bias points, readout power, or other parameters. Data that is taken during a calibration procedure may be referred to herein as "calibration data".

The calibration data may comprise some or all of the system response signal S(x), or it may be derived from the measured system response signal S(x) by pre-processing the system response signal S(x), e.g. by applying one or more mathematical/statistical/discriminatory transformations to the system response signal S(x), e.g. using dimensionality reduction such as principal component analysis.

Performing a calibration may include fitting one or more parameters of a qubit calibration model to the calibration data, using a fitter algorithm, thereby to obtain one or more fitted values from which one or more parameters relating to the qubit may be inferred. The qubit calibration model may be heuristic, theoretical (derived from physical theory (e.g. by a theorist)), or it may be a model which has been modified or developed using machine learning in accordance with various examples disclosed herein.

Depending on the calibration, the fitter may implement a regression or classification algorithm. For regression-based calibrations, the method may include obtaining the best fit parameters of the qubit calibration model to the data, and inferring qubit parameters from those best-fit parameters. For classification-based calibrations, the method may include extracting parameters defining a decision boundary, by analysing the calibration data using a qubit calibration model. In this case S(x) may comprise a discriminatory label such as 0, 1, 2 etc which may for example represent a qubit state.

Qubit calibration models may be physical models (i.e. they may be derived from physics theory), or they may be heuristic models. Many calibration models, which are either heuristic or derived from physics theory (e.g. "toy models") can sometimes be too simple for reliably extracting parameters at scale. This may for example be due to imperfections in hardware or due to simplifications that were made when deriving the model, for example leaving out higher qubit levels or auxiliary hardware, or due to unforeseen physics governing the behaviour of the qubit. Refining a toy model starting from first physical principles can be exceptionally difficult.

In an exemplary method according to one aspect of this disclosure, a learning module refines a qubit calibration model using a supervised machine learning algorithm. The supervised machine learning algorithm may be trained using training data comprising a plurality of calibration data sets obtained by performing a calibration on multiple occasions on the same or different qubits. The training data also includes extracted parameter sets corresponding to the calibration data sets. Each extracted parameter set may comprise one or more qubit parameters which have been extracted using the methodology that has been discussed above.

The learning module may process the training data to learn a perturbation $g(x, p')$ to the qubit calibration model so as to obtain a refined qubit calibration model which may capture features in the calibration data which are not captured by the model $f(x, p)$. Such features may comprise "imperfections" in the calibration data which are consistent across many calibration data sets. By "imperfection", we mean any feature which is present in the calibration data but not represented by the model $f(x, p)$: examples include features resulting from higher order effects or unforeseen physics. Thus, the refined qubit calibration model may better represent the calibration data compared to the original model $f(x, p)$.

In this way the refined qubit calibration model may allow parameters to be extracted more reliably. More specifically, parameters for a given qubit may be extracted using a calibration model developed from a large subset of all previously calibrated qubits. The perturbative refinement fits away consistent imperfections across the calibration data to make it easier to extract the qubit parameters, thereby improving qubit calibration. In some cases, the perturbative refinement may also allow extraction of one more qubit parameters which could not be extracted using the original model, thereby allowing intelligent seeding or supplanting of other calibrations, and so improving the calibration process further. As described in more detail below, a basis expansion method along with a supervised learning algorithm may be used to refine the qubit calibration model.

For regression-based calibrations, the machine learning algorithm may comprise a linear or nonlinear regression algorithm such as linear or nonlinear least squares or neural network regression. For classification-based calibrations, the machine learning algorithm may comprise linear or nonlinear machine learning classifiers, including classifiers based on least squares, nearest-neighbour methods, linear discriminant analysis, quadratic discriminant analysis, logistic regression, support vector machines or neural networks. In some cases, ensemble learning may be employed, e.g. multiple learning algorithms may be combined into a single learning algorithm that combines the constituent algorithms' strengths. Ensemble learning may be employed for both regression and classification algorithms.

Figure 2:
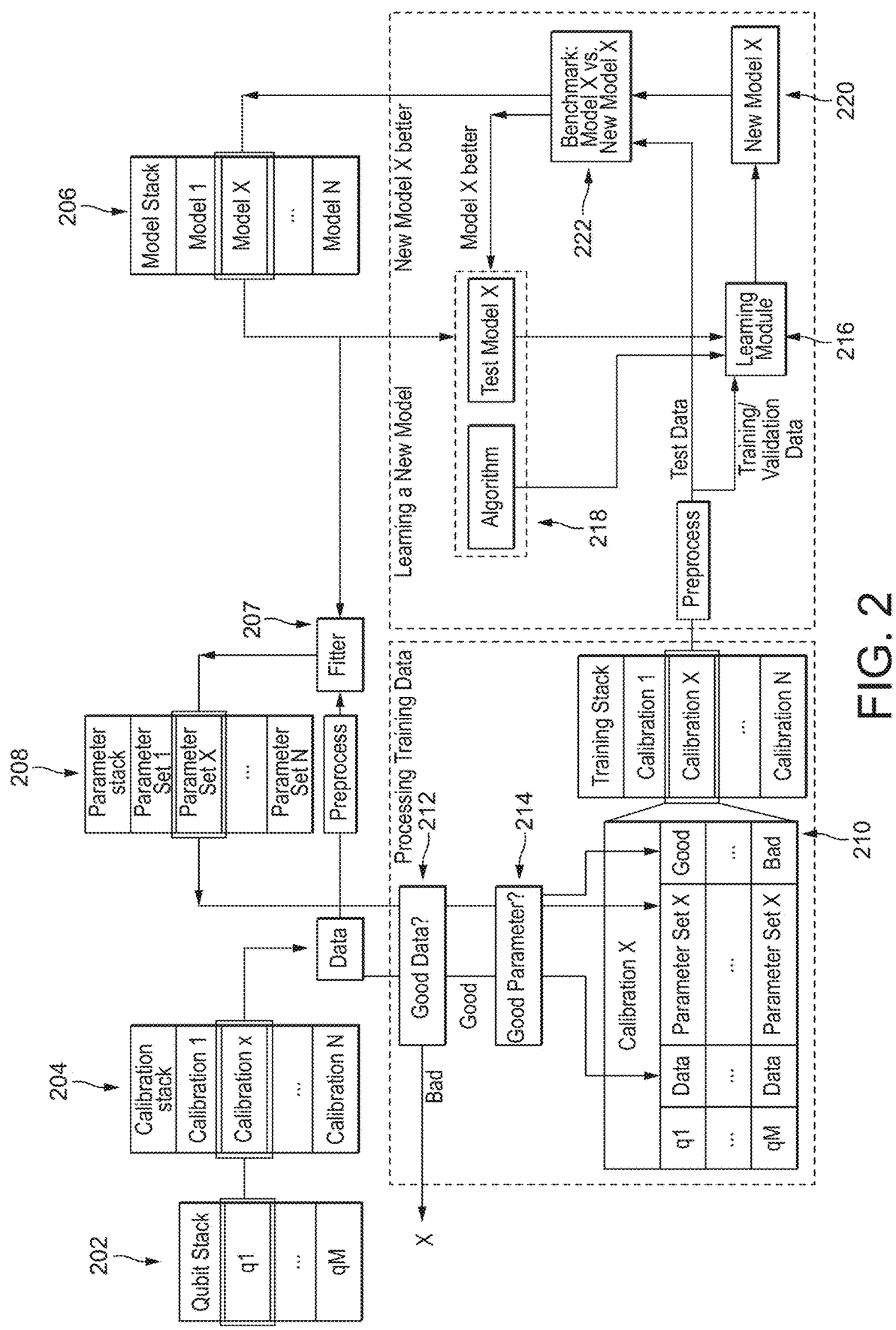
FIG. 2 illustrates an automated qubit calibration workflow in accordance with one example embodiment.
Figure 3:
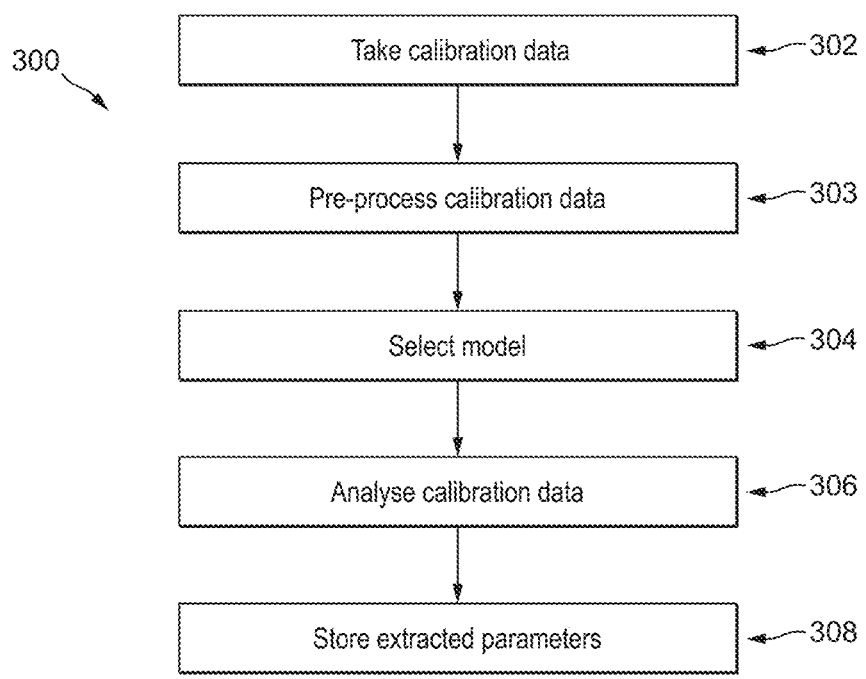
FIG. 3 illustrates steps in a method for calibrating a qubit.

FIG. 2 illustrates an automated qubit calibration workflow in accordance with one example embodiment. As shown, a qubit qi may be selected from the qubit stack 202. For each calibration X in the calibration stack 204, the method 300 illustrated in FIG. 3 may be performed. As shown, calibration data may be taken 302, and pre-processed 303, e.g. by re-scaling, dimensionality reduction etc. A model may be selected 304 from the model stack 206 to analyse the calibration data (calibration data X uses model X, for example). The calibration data may be analysed 306 using a fitter 207.

Depending on the calibration the fitter 207 may implement a regression algorithm or a classification algorithm. For regression-based calibrations, the best-fit parameters of the selected model to the calibration data may be extracted, and a parameter set may be inferred from those best-fit parameters. For classification-based calibrations, a decision boundary may be extracted by analysing the calibration data via the algorithm given by model X. In either case, the extracted parameters may be stored 308 in the parameter stack 208.

Processing Training Data

A training stack 210 may be developed using the stored calibration data and corresponding parameters sets. The training stack may be updated regularly after some number of calibrations or time interval (e.g. weekly). To update the training stack 210, calibration data and corresponding extracted parameter sets may be pulled from the calibration and parameters stacks 204, 208 for many qubits (e.g. across many chips).

One or more discrimination processes 212, 214 may be executed to discriminate "good" and "bad" data. In a first discrimination process 212, calibration data is evaluated to determine whether it is "good" calibration data or "bad" calibration data. In a second discrimination process 214, parameter sets are evaluated to determine whether they are "good" or "bad" parameter sets.

"Good" calibration data means that one should be able to extract the correct parameter set from it. From the hardware perspective this means that the qubit is good and the hardware was set up properly when the data was taken. On the other hand, "bad" calibration data means that one cannot extract the correct parameter set from it (e.g. the calibration data is noise). This can result for example due to fabrication errors in manufacture of the qubit, or if the hardware was not set up properly when taking data. Calibration data may be discriminated using an independently trained classification algorithm to decide whether the calibration data is good or bad. Alternatively, or in addition, calibration data may be discriminated based on whether a later calibration was carried on the qubit (e.g. the last calibration in a calibration sequence). If a qubit "makes it" to the last calibration is a sequence of calibrations, this suggests that good calibration data was probably acquired for all previous calibrations in the sequence. "Bad" calibration data set may be discarded, i.e. not be added to the training stack (together with corresponding parameter sets).

A second discrimination process 214 may be employed to determine if parameter sets are "good" or "bad" parameter sets. A "good" parameter set means that a parameter set was extracted which accurately describes the qubit or which is at least capable of accurately describing a qubit. A "bad" parameter set means that an incorrect parameter set was extracted. Data sets where the calibration data is "good" but the parameter set is "bad" are useful in that they may help an algorithm to learn to minimise such occurrences. Furthermore, they are useful for benchmarking models against one another. Parameter sets may be discriminated by applying one or more thresholds to the parameter set, e.g. the parameter set should fall within some hardware-defined limit(s).

Good calibration data and corresponding extracted parameter sets may be added to the training stack. A binary and/or real-number indicator may be included with each training example to specify if the parameter set has been determined "good" or "bad" and/or the extent to which it is "good" or "bad".

Learning a New Model

Figure 4:
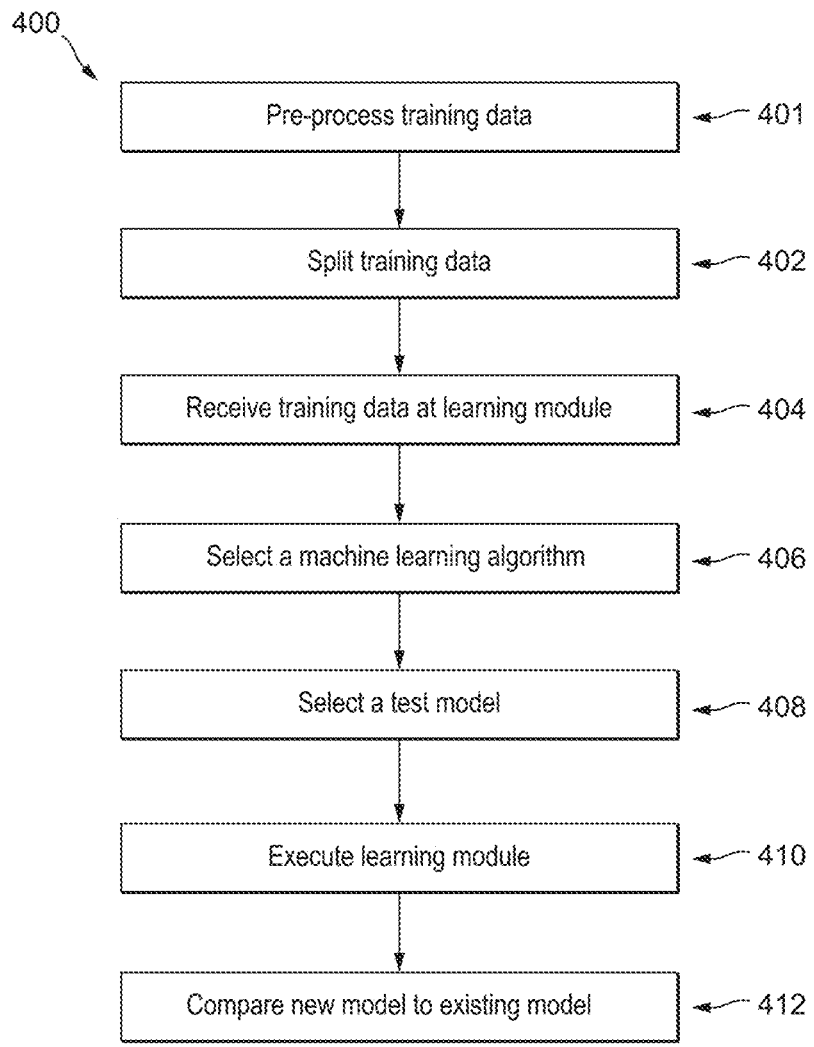
FIG. 4 illustrates steps in a method for learning a new qubit calibration model.

A qubit calibration model for each calibration may be developed or updated using data in the training stack. The model may be updated for example after some regular number of calibrations or time interval (e.g. weekly). FIG. 4 illustrates a method for learning a new qubit calibration model. As shown, in step 401, the training data is preprocessed (e.g. by re-scaling/dimensionality reduction). In step 402 the training data is split into training/validation/test data sets. The training and validation data may be received 404 at a learning module 216. In step 406, the learning module selects a supervised machine learning algorithm 218, which is fed into the learning module 216. For regression-based calibrations, the supervised machine learning algorithm may comprise a linear or nonlinear regression algorithm such as linear or nonlinear least squares or neural network regression. For classification-based calibrations, the machine learning algorithm may comprise linear or nonlinear machine learning classifiers, including classifiers based on least squares, nearest-neighbour methods, linear discriminant analysis, quadratic discriminant analysis, logistic regression, support vector machines or neural networks. In some cases, ensemble learning may be employed, e.g. multiple learning algorithms may be combined into a single learning algorithm that combines the constituent algorithms' strengths. Ensemble learning may be employed for both regression and classification algorithms.

In step 408, a test model is fed into the learning module 216. In principle any rich enough test model (e.g. a higher-order polynomial or Fourier expansion) should return a good model for any set of consistent training data. However an issue with this "blind" approach is that it might not be clear how to generally and reliably extract the parameter set from that model. For this reason, the test model may instead be formed by adding a perturbation to an existing qubit calibration model. The purpose of the perturbative "refinement" is to fit away imperfections to make it easier to extract "good" parameter sets at scale. For regression in particular, the refinement makes it easier to access the parameter set via the non-perturbed model. As noted above, the existing model may be a model which has roots in physics theory, or may be a heuristic model, or it may be a model which has been previously been refined by the learning module 216. The perturbation may be rich enough to represent consistent deviations of the calibration data in the training stack from the existing model, but without impeding the general and reliable extraction of parameter sets. The complexity of the model may be controlled by applying some combination of shrinkage, regularization, restriction, or selection methods. In some examples the test model may be obtained using a basis expansion method (see below).

In step 410, the learning module 216 is executed to learn a new model 220 by optimising the test model using the supervised machine learning algorithm 218. The new model 220 may then be benchmarked 412, 222 against the existing model. In particular, a comparison may be made of the number of good parameter sets extracted for the models under comparison, using the test data. More generally, comparisons between models may be made based on one or more metrics such as test/generalization error, model complexity, and how reliably and generally qubit parameters can be extracted from the new model.

The steps 406, 408, 410 and 412 may be repeated until the new model outperforms the existing model with respect to the metrics discussed above. In that case, the new model replaces the existing model in the model stack 206.

Regression and Classification Examples

As discussed above, qubit calibration models f(x, p) may comprise "toy" models, e.g. derived from physics theory, or heuristic model, or models developed using supervised learning as described herein. x and p may be arrays of arbitrary dimension, which means that calibration data can have arbitrary dimension and an arbitrary number of model parameters can be fitted. During a calibration, the model f(x, p) is fitted to the calibration data to determine the best fit parameters, $p_{fit}$. The parameters that are stored in the parameter stack 208 (i.e. the "extracted parameters") are parameters relating to the qubit, which may be inferred from $p_{fit}$. Hence the parameter set that is stored in the parameter stack 208 may either be some subset of $p_{fit}$ or some function of some subset of $p_{fit}$.

In many cases the fit parameters $p_{fit}$ are "good" in the sense that they extract correct information about the qubit. In some cases, however, a poor fit returns a "bad" parameter set, which can crash the calibration workflow. In some cases, there may be some features in the calibration data which are not accounted for in the model f(x, p) but which are consistent across many calibration data sets for many qubits, which give rise to difficulties in obtaining a good fit. These background features can be due to complicated effects that are not included in the toy model f(x, p), either intentionally or simply because the underlying physical effects are not understood.

Regression Example

Figure 5:
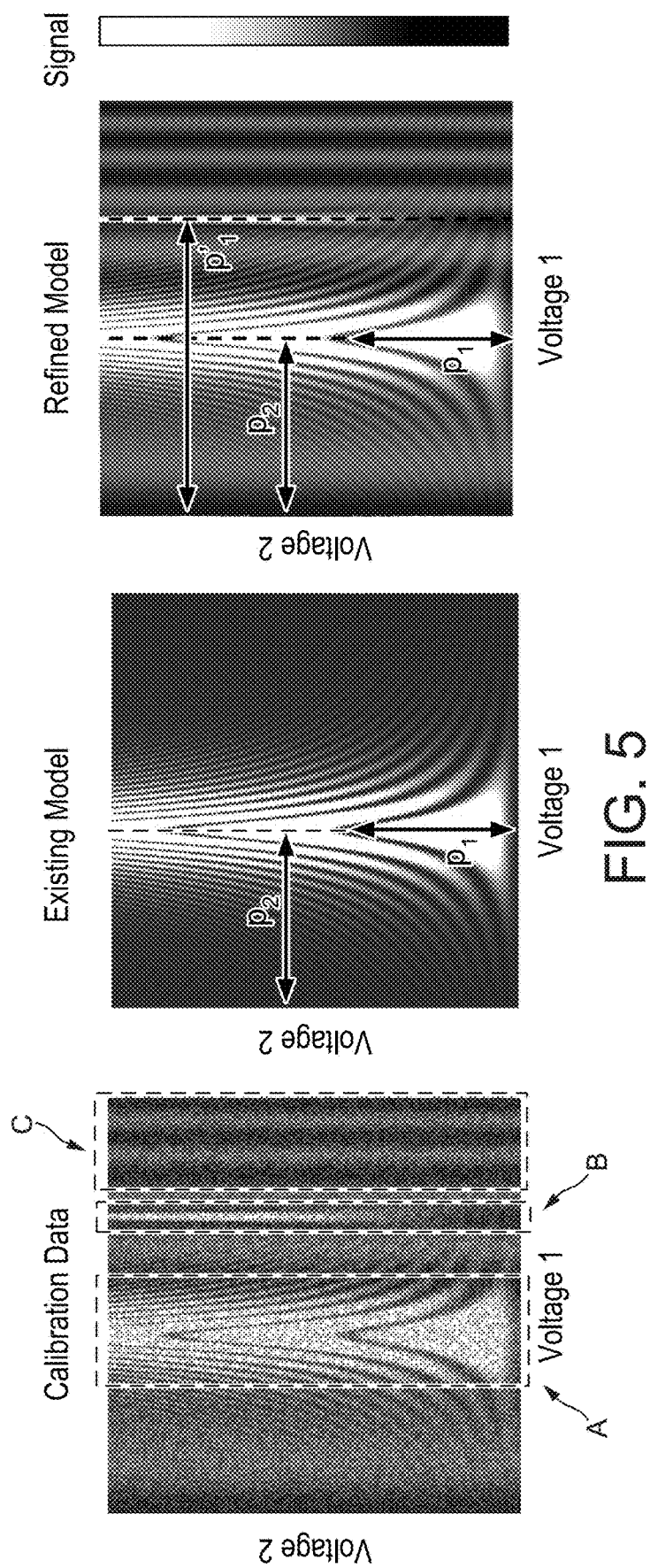
FIG. 5 is an illustration depicting: calibration data for a regression-based calibration.

FIG. 5 schematically illustrates calibration data in the form of a signal obtained in a Rabi driving calibration. The calibration data is obtained by varying hardware parameters in the form of control line voltages (Voltage 1 and Voltage 2) and then measuring the signal of a readout pulse. The pattern shown in region A is expected based on an existing model. Hence, calibration data may be fitted to the existing model to obtain parameters p1 and p2. Parameter p1 may then be used to infer the p1 pulse amplitude and parameter p2 may be used to infer the qubit frequency. The vertical line shown in region B arises due to higher order qubit levels, which are not accounted for in the existing model. The additional lines shown in region C are also not accounted for in the toy model, and relate to unforeseen physics or other unforeseen effects. Such "imperfections", which are not captured by the existing model, may cause errors in accurate extraction of parameters from the calibration data. However by employing supervised learning as described herein, the existing model may be refined to capture such "imperfections", thereby allowing more reliable extraction of qubit parameters. Additionally, the refined model may enable us to extract an additional parameter $p'_1$, which relates to a higher qubit level. This additional extraction might enable us to intelligently seed or supplant a future calibration, further improving the full calibration procedure. In particular, the existing model may be perturbatively refined by applying a regression algorithm (e.g. least square regression or neural network regression), using a test model, which may be generated using a basis expansion method.

Classification Example

FIG. 6 schematically illustrates a calibration in the form of a signal obtained in a qubit readout calibration. The calibration data is obtained by preparing the qubit into one of its states (this serves as the label) and then measuring the voltage quadratures (Voltage 1 and Voltage 2) of a readout pulse. The calibration data comprises at least two "clouds" of labelled points, and the calibration involves determining one or more decision boundaries separating the labels. In an ideal case, the clouds might be the same size and circular and a trivial decision boundary such as a straight line that is perpendicular to the line joining the cloud centers and halfway between the cloud centers could be used. However, due to complicated physics and/or other imperfections, in practice the clouds are usually not the same size and are not circular. Such "imperfections", which are not captured by the existing model, may lead to the extraction of a decision boundary that mis-classifies many labelled points. However by employing supervised learning as described herein, the existing model may be refined to capture such "imperfections", and lead to the extraction of a better decision boundary that mis-classifies fewer points. For example, the existing model may be perturbatively refined by applying least squares classification with a test model generated using a basis expansion method.

Perturbative Approach and Basis Expansion Method

As discussed above supervised learning may be used to learn a perturbation g(x, w, p') that captures consistent features in the calibration data that are not included in f(x, p). The refined model $f(x, p, w, p')=f(x, p)+g(x, w, p')$ may allow more reliable extraction of qubit parameters. This perturbation approach may be applied for both regression and classification examples. For regression, these parameters (e.g. the parameter set that is stored into the "parameter stack") may still be extracted from f(x, p) and not g(x, w, p') (e.g. qubit information is extracted from $p_{fit}$ and not p'fit). For classification, they may be extracted from the best fit parameters of f(x, p)+g(x, w, p'). For regression, the perturbations help mimic the data, whereas for classification, the perturbations help to better separate the data. For regression, f(x, p, w, p') serves as the "regression function", while for classification it serves as the "discriminant function".

In some embodiments a basis expansion method, in combination with a supervised learning algorithm, may be used to find the refined model. This approach may be applied for both regression and classification examples. In the basis expansion method, M basis perturbation models are added to arrive at the total perturbation:

$$g(x,w,p')=g(x,w,p'_1, \ldots p'_M)=\Sigma_{m=1}^{M} w_m g_m(x,p'_m)$$

The test model is obtained by adding the perturbation to the existing model:

$$t(x,p,w,p')=f(x,p)+\Sigma_{m=1}^{M} w_m g_m(x,p'_m)$$

x—an array of hardware parameters
p—an array of parameters of the unperturbed model.
$p'=(p'_1, p'_M)$—an array of arrays. $p'_i$—an array of parameters of the i-th basis model.
$w=(w_1, w_M)$—weights of the basis models. One per model; $g_m(x, p'm)$ can apply any linear, nonlinear, or discriminatory transformation on any linear or nonlinear combination of inputs x and $p'_m$. Examples are:
$g_m(x, p'_m)=p_m x_m$ (for m=1 . . . dim(x)) (linear model)
$g_m(x, p'_m)=E_{ijkl} \, p_{ijkl} \, x_i^k x_j^l$
$g_m(x, p'_m)=E_{ijkl} \, p_{ijkl,o} \sin(p_{ijkl,1} x_i^k x_j^l + p_{ijkl,2})$
$g_m(x, p'_m)=\{a \text{ if } f(x, p'_m)>k, \text{ else } b\}$, for arbitrary a, b, k, $f(x, p'_m)$
Note that basis models can, in general, implement transformations of the input variables to include variables such as $x_i^k x_j^l = \text{voltage}_i^k * \text{phase}_j^l$
Note that $p'_m$ can encode parameters such as $p_{ijkl}$.

During the learning stage, to control the complexity of the refined model, one or more of shrinkage, regularization, restriction, or selection methods may be used.

Various cost functions are possible, e.g. depending on the supervised learning algorithm. An example cost function for both regression and classification may be of the form:

$$C(w,p,p')=\Sigma_x \Sigma_i (S_i(x)-t(x,w,p,p'))^2 + \lambda \Lambda(w) + \lambda' \Lambda'(p,p')$$

Here i indexes the training data, for which the signal is $S_i(x)$. The learning module 216 minimises C(w, p, p') with respect to w, p and p' to find:

$$\dot{w},\dot{p},\dot{p}'=\text{argmin}_{w,p,p'} C(w,p,p')$$

The optimized basis function weights $\dot{w}$ are then used to construct the refined model $f(x, p, w, p')=f(x, p)+g(x, w, p')$. Typically, basis functions may be discarded if their corresponding weights $\dot{w}_m$ fall below some reasonable threshold. The optimized parameters $\dot{p}$ and $\dot{p}'$ are not typically used to construct the refined model and are not fixed in the refined model f(x, p, w, p'). In fact, p and p' are the parameters that are optimized by the fitter during calibration.

To control the complexity of the refined model, we may use regularization, which is governed by the regularization parameters X and X' and corresponding regularization functions $\Lambda(w)$ and $\Lambda'(p, p')$. The regularization parameters may be tuned during the learning stage using the validation data and established methods. In this example, we allow for different types of regularization for the basis function weights w and the parameters of the basis functions and existing model p' and p, respectively. Li regularization may be used for the basis function weights ($\Lambda(w)=\Sigma_{m=1}^{M}|w_m|$). This is an attractive approach since it tends to completely nullify perturbation models that poorly represent the training data (i.e. by setting their optimal weights $\dot{w}_m$ exactly to 0). The learning algorithm can also be penalized if it tries to converge on parameters p, p' that exceed reasonable hardware limits through some judiciously chosen regularization function $\Lambda'(p, p')$.

As discussed above, the perturbative refinement fits away "imperfections" (e.g. features relating to higher order qubit levels or features due to unforeseen but consistent effects) to make it easier to extract a good parameter set. In some examples the learned features may also be correlated to other qubit parameters, thereby allowing other calibrations to be seeded intelligently or supplanted altogether. For example, in FIG. 5, the refined model additionally allows the parameter $p'_1$, which derives from higher order qubit levels, to be fitted.

Figure 7:
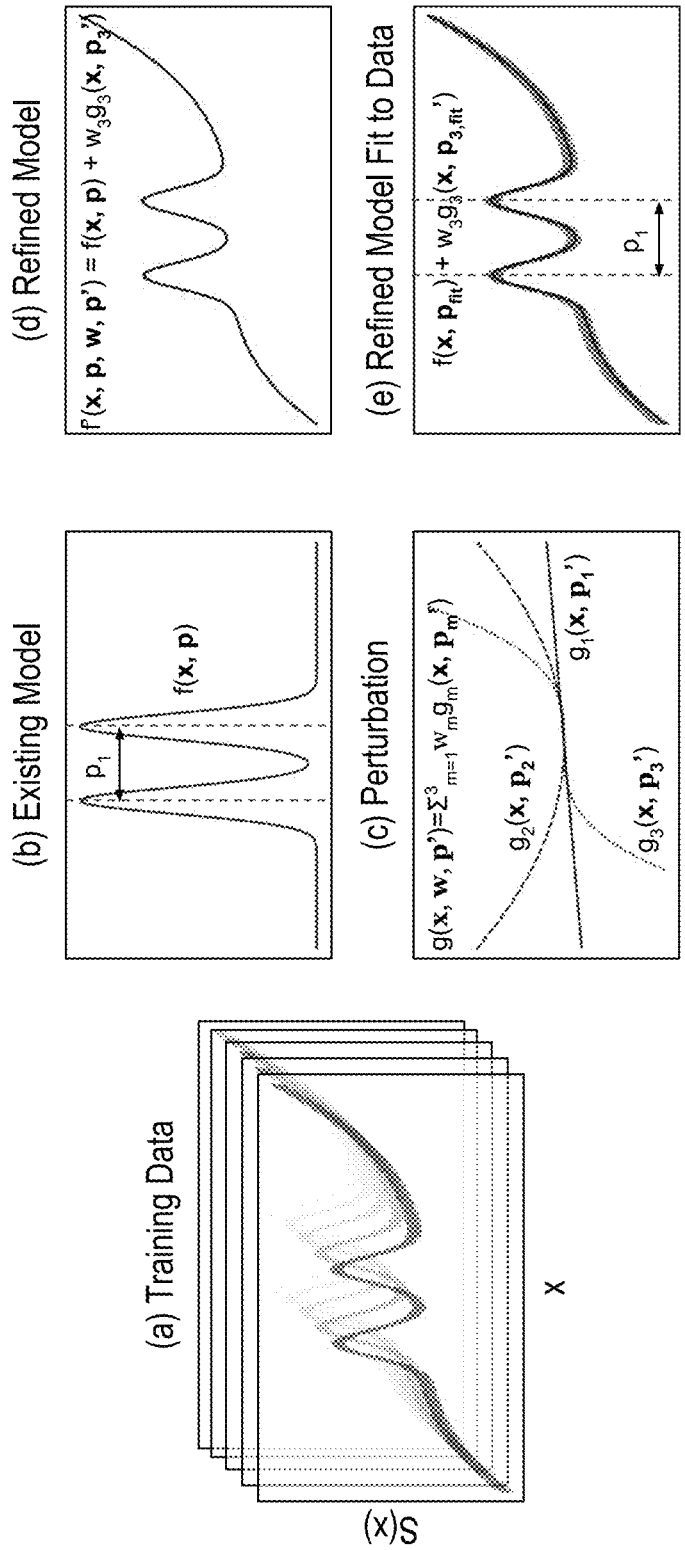

By way of example, FIG. 7 separately illustrates the perturbative approach and the basis expansion method for a regression calibration. FIG. 7(a) is an illustrative depiction of calibration data in the training stack. FIG. 7(b) shows the existing calibration model f(x, p) used to fit the calibration data in order to extract some qubit parameter p1. Clearly the data has some consistent imperfections with respect to the existing model, which can make it hard to reliably extract the qubit parameter $p_1$ at scale. We refine the model perturbatively by applying the basis expansion method in combination with supervised learning as discussed in detail above. For this example, the perturbation g(x, w, p') comprises the three basis functions shown in FIG. 7(c). The test model is then given by t(x, p, w, p')=f(x, p)+g(x, w, p'). The parameters of the test model are optimized via the learning algorithm. For this example, the learning algorithm might find that only the third basis function accurately represents the training data (e.g. only $w_3$ is of substantial magnitude, above some reasonable threshold). This enables us to construct the refined model f(x, p, w, p')=f(x, p)+$w_3g_3$(x, p'), which can then be benchmarked against f(x, p). If the refined model outperforms the existing model on the test data, with respect to the metrics discussed above, it becomes the existing model in the model stack. Note that p1 may be extracted from $p_{fit}$ and not $p_{fit}'$ (e.g. the parameter is not extracted from the perturbation).

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, the reference to these arrangements of operations in terms of modules should not be considered to imply a structural limitation and references to functional names is by way of illustration and does not infer a loss of generality.

Certain aspects of the present invention include process steps and instructions described herein in the form of an algorithm. It should be understood that the process steps, instructions, of the present invention as described and claimed, are executed by computer hardware operating under program control, and not mental steps performed by a human. Similarly, all of the types of data described and claimed are stored in a computer readable storage medium operated by a computer system, and are not simply disembodied abstract ideas. In addition, the present invention is not described with reference to any particular programming language. It is appreciated that a variety of programming languages may be used to implement the teachings of the present invention as described herein.

The present invention also relates to a computing apparatus for performing the computing operations described herein. This computing apparatus may be specially constructed for the required purposes, or it may comprise a general-purpose computer selectively activated or reconfigured by a computer program stored on a computer readable medium that can be executed by the computer. The computing apparatus referred to in the specification may include a single processor or may be architectures employing multiple processor designs for increased computing capability.

Implementations of the quantum subject matter and quantum operations described in this specification may be implemented in suitable quantum circuitry or, more generally, quantum computational systems, including the structures disclosed in this specification and their structural equivalents, or in combinations of one or more of them. The term "quantum computational systems" may include, but is not limited to, quantum computers, quantum information processing systems, quantum cryptography systems, or quantum simulators.

The terms quantum information and quantum data refer to information or data that is carried by, held or stored in quantum systems, where the smallest non-trivial system is a qubit, e.g., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Quantum circuit elements may be used to perform quantum processing operations. That is, the quantum circuit elements may be configured to make use of quantum-mechanical phenomena, such as superposition and entanglement, to perform operations on data in a non-deterministic manner. Certain quantum circuit elements, such as qubits, may be configured to represent and operate on information in more than one state simultaneously. Examples of superconducting quantum circuit elements that may be formed with the processes disclosed herein include circuit elements such as co-planar waveguides, quantum LC oscillators, qubits (e.g., flux qubits or charge qubits), superconducting quantum interference devices (SQUIDs) (e.g., RF-SQUID or DCSQUID), inductors, capacitors, transmission lines, ground planes, among others.

In contrast, classical circuit elements generally process data in a deterministic manner. Classical circuit elements may be configured to collectively carry out instructions of a computer program by performing basic arithmetical, logical, and/or input/output operations on data, in which the data is represented in analogue or digital form. In some implementations, classical circuit elements may be used to transmit data to and/or receive data from the quantum circuit elements through electrical or electromagnetic connections. Examples of classical circuit elements that may be formed with the processes disclosed herein include rapid single flux quantum (RSFQ) devices, reciprocal quantum logic (RQL) devices and ERSFQ devices, which are an energy-efficient version of RSFQ that does not use bias resistors. Other classical circuit elements may be formed with the processes disclosed herein as well.

During operation of a quantum computational system that uses superconducting quantum circuit elements and/or superconducting classical circuit elements, such as the circuit elements described herein, the superconducting circuit elements are cooled down within a cryostat to temperatures that allow a superconductor material to exhibit superconducting properties.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. For example, the actions recited in the claims can be performed in a different order and still achieve desirable results. In certain circumstances, multitasking and parallel processing may be advantageous. Moreover, the separation of various components in the implementations described above should not be understood as requiring such separation in all implementations.

A number of implementations have been described. Nevertheless, it will be understood that various modifications may be made within the scope of the following claims.

The invention claimed is:

1. An automated qubit calibration method for calibrating physical qubits, comprising:
    performing calibrations on one or more physical qubits to obtain calibration data sets and corresponding parameter sets, wherein performing each calibration comprises:
        obtaining a calibration data set from a system comprising one or more physical qubits;
        selecting a qubit calibration model, corresponding to the calibration data set from a plurality of stored qubit calibration models;
        extracting one or more parameters from the calibration data set, comprising fitting one or more parameters of the selected qubit calibration model to the calibration data set, using a fitter algorithm; and
        storing the one or more extracted parameters as a parameter set; and
    refining one of the stored qubit calibration models, comprising:
        executing, at a learning module, a supervised machine learning algorithm which processes a plurality of the calibration data sets and corresponding parameter sets to learn a perturbation to the stored qubit calibration model that captures one or more features in the plurality of calibration data sets that are not captured by the qubit calibration model, thereby to provide a refined qubit calibration model;
        comparing the performance of the refined qubit calibration model and the stored qubit calibration model; and
        replacing the stored qubit calibration model with the refined qubit calibration model in dependence on the comparison.

2. The method according to claim 1, wherein the refined qubit calibration model is given by $f'(x, p, p')=f(x, p)+g(x, p')$, wherein $f(x, p)$ is the model and $g(x, p')$ is a perturbation function, wherein x represents one or more hardware parameters, p represents one or more model parameters, and p' represents parameters of the perturbation function.

3. The method according to claim 2, wherein a basis expansion method is used to determine the perturbation.

4. The method according to claim 1, wherein the supervised machine learning algorithm comprises a linear or nonlinear regression algorithm based on linear or nonlinear least squares regression, or a neural network.

5. The method according to claim 1, wherein the supervised machine learning algorithm comprises a machine learning classifier wherein each parameter set processed by the supervised machine learning algorithm defines at least one decision boundary defining a boundary between one or more groups of calibration data points.

6. The method according to claim 5, wherein the machine learning classifier comprises a linear or nonlinear classifier based on least squares, linear or quadratic discriminant analysis, logistic regression, support vector machine or a neural network.

7. The method according to claim 1, wherein the learning module employs one or more of shrinkage, regularization, restriction, or selection methods.

8. The method according to claim 1, comprising comparing the refined qubit calibration model to the stored qubit calibration model based on at least one of: test and/or generalization error, and model complexity.

9. The method according to claim 1, wherein the qubit is a system based on at least one of: a superconducting qubit, a system based on one or more ion traps, quantum dots, neutral atoms, Rydberg states, solid-state defects, molecules, or photons.

10. The method according to claim 1, wherein the refined qubit calibration model permits extraction of one or more qubit parameters which could not be extracted using the qubit calibration model.

11. The method according to claim 1, further comprising:
    performing a plurality of calibrations using a plurality of respective refined qubit calibration models; and
    further refining one or more of said refined qubit calibration models.

12. The method according to claim 1, comprising selecting a qubit and performing a sequence of calibrations on the selected qubit, wherein one or more of said calibrations are performed dependent on whether one or more earlier calibrations are performed successfully, comprising determining whether a calibration data set should be processed by the supervised machine learning algorithm dependent on whether a later calibration in the sequence is performed.

13. The method according to claim 1, comprising determining whether a calibration data set is processed by the supervised machine learning algorithm using a computer-implemented classification algorithm.

14. A system comprising one or more computers and one or more storage devices storing instructions that are operable, when executed by the one or more computers, to cause the one or more computers to perform operations comprising:
  performing calibrations on one or more physical qubits to obtain calibration data sets and corresponding parameter sets, wherein performing each calibration comprises:
    obtaining a calibration data set from a system comprising one or more physical qubits;
    selecting a qubit calibration model, corresponding to the calibration data set from a plurality of stored qubit calibration models;
    extracting one or more parameters from the calibration data set, comprising fitting one or more parameters of the selected qubit calibration model to the calibration data set, using a fitter algorithm; and
    storing the one or more extracted parameters as a parameter set; and
  refining one of the stored qubit calibration models, comprising:
    executing, at a learning module, a supervised machine learning algorithm which processes a plurality of the calibration data sets and corresponding parameter sets to learn a perturbation to the stored qubit calibration model that captures one or more features in the plurality of calibration data sets that are not captured by the qubit calibration model, thereby to provide a refined qubit calibration model;
    comparing the performance of the refined qubit calibration model and the stored qubit calibration model; and
    replacing the stored qubit calibration model with the refined qubit calibration model in dependence on the comparison.

15. The system according to claim 14, wherein the refined qubit calibration model is given by $f'(x, p, p')=f(x, p)+g(x, p')$, wherein $f(x, p)$ is the model and $g(x, p')$ is a perturbation function, wherein x represents one or more hardware parameters, p represents one or more model parameters, and p' represents parameters of the perturbation function.

16. The system according to claim 15, wherein a basis expansion method is used to determine the perturbation.

17. The system according to claim 14, wherein the operations further comprise performing a plurality of calibrations using the refined qubit calibration model.

18. A computer-readable storage medium comprising instructions stored thereon that are executable by a processing device and upon such execution cause the processing device to perform operations comprising:
  performing calibrations on one or more physical qubits to obtain calibration data sets and corresponding parameter sets, wherein performing each calibration comprises:
    obtaining a calibration data set from a system comprising one or more physical qubits;
    selecting a qubit calibration model, corresponding to the calibration data set from a plurality of stored qubit calibration models;
    extracting one or more parameters from the calibration data set, comprising fitting one or more parameters of the selected qubit calibration model to the calibration data set, using a fitter algorithm; and
    storing the one or more extracted parameters as a parameter set; and
  refining one of the stored qubit calibration models, comprising:
    executing, at a learning module, a supervised machine learning algorithm which processes a plurality of the calibration data sets and corresponding parameter sets to learn a perturbation to the stored qubit calibration model that captures one or more features in the plurality of calibration data sets that are not captured by the qubit calibration model, thereby to provide a refined qubit calibration model;
    comparing the performance of the refined qubit calibration model and the stored qubit calibration model; and
    replacing the stored qubit calibration model with the refined qubit calibration model in dependence on the comparison.

19. The computer-readable storage medium according to claim 18, wherein the refined qubit calibration model is given by $f'(x, p, p')=f(x, p)+g(x, p')$, wherein $f(x, p)$ is the model and $g(x, p')$ is a perturbation function, wherein x represents one or more hardware parameters, p represents one or more model parameters, and p' represents parameters of the perturbation function.

20. The computer-readable storage medium according to claim 19, wherein a basis expansion method is used to determine the perturbation.

* * * * *